(12) United States Patent
Berezny et al.

(10) Patent No.: US 9,598,986 B2
(45) Date of Patent: Mar. 21, 2017

(54) FIVE-WAY OIL CONTROL VALVE WITH INTEGRATED VENTING SPOOL

(71) Applicant: BorgWarner Inc., Auburn Hills, MI (US)

(72) Inventors: Michael R. Berezny, Orion, MI (US); Garrett R. Holmes, Lake Orion, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/412,753

(22) PCT Filed: Jul. 3, 2013

(86) PCT No.: PCT/US2013/049237
§ 371 (c)(1),
(2) Date: Jan. 5, 2015

(87) PCT Pub. No.: WO2014/011472
PCT Pub. Date: Jan. 16, 2014

(65) Prior Publication Data
US 2015/0192042 A1    Jul. 9, 2015

Related U.S. Application Data

(60) Provisional application No. 61/671,175, filed on Jul. 13, 2012.

(51) Int. Cl.
| | | |
|---|---|---|
| *F01L 1/34* | (2006.01) | |
| *F01L 1/344* | (2006.01) | |
| *F16K 11/07* | (2006.01) | |

(52) U.S. Cl.
CPC .............. *F01L 1/3442* (2013.01); *F01L 1/344* (2013.01); *F16K 11/0716* (2013.01);
(Continued)

(58) Field of Classification Search
CPC ................ F01L 2001/34426; F01L 2001/3443
(Continued)

(56) References Cited

U.S. PATENT DOCUMENTS

| | | |
|---|---|---|
| 5,497,738 A | 3/1996 | Siemon et al. |
| 6,247,434 B1 | 6/2001 | Simpson et al. |

(Continued)

OTHER PUBLICATIONS

International Search Report.

*Primary Examiner* — Jorge Leon, Jr.

(57) ABSTRACT

A fluid flow control valve (10) having an elongated valve body (14) with a longitudinally extending aperture (14a) and a plurality of longitudinally spaced, radially extending ports (14b) formed therein. The valve body (14) includes an undercut portion (14c) located between two adjacent radially extending ports (14b). A valve spool (12) within the longitudinally extending aperture (14a) of the valve body (14) can be moved between first and second end limits of travel. The valve spool (12) has a plurality of lands (12a) and reduced diameter portions (12b) defining fluid passages (18) for fluid communication with selective radially extending ports (14b) of the valve body (14) depending on a longitudinal position of the valve spool (12) within the valve body (14). A longitudinally extending passage (12c) and a radially extending passage (12d) are formed in the valve spool (12). The radially extending passage (12d) terminates in one land (12a) of the valve spool (12) for fluid communication with the undercut portion (14c) of the valve body (14).

5 Claims, 2 Drawing Sheets

(52) U.S. Cl.
CPC ............... *F01L 2001/3443* (2013.01); *F01L 2001/34433* (2013.01); *F01L 2820/01* (2013.01); *Y10T 137/8671* (2015.04)

(58) Field of Classification Search
USPC ...................................................... 123/90.15
See application file for complete search history.

(56) References Cited

U.S. PATENT DOCUMENTS

| | | |
|---|---|---|
| 6,374,787 B2 | 4/2002 | Simpson et al. |
| 6,681,806 B2 | 1/2004 | Isobe |
| 6,941,913 B2 | 9/2005 | Smith |
| 7,131,410 B2 | 11/2006 | Kondo et al. |
| 7,584,728 B2 | 9/2009 | Berndorfer |
| 7,841,310 B2 | 11/2010 | Child |
| 8,166,937 B2 | 5/2012 | Yamaguchi et al. |
| 8,464,675 B2 | 6/2013 | Waters et al. |
| 2009/0178635 A1* | 7/2009 | Takenaka .............. F01L 1/3442 123/90.17 |
| 2009/0230337 A1* | 9/2009 | Hoppe .................... F01L 1/344 251/62 |
| 2010/0313835 A1* | 12/2010 | Yamaguchi ........... F01L 1/3442 123/90.15 |

\* cited by examiner

FIVE-WAY OIL CONTROL VALVE WITH INTEGRATED VENTING SPOOL

FIELD OF THE INVENTION

The invention relates to control of fluid flow between phaser chambers allowing cam shaft control and manipulation, and more particularly where the porting structure is located within the housing and the bearing to control oil flow.

BACKGROUND

Control valves for variable camshaft timing (VCT) systems are generally known. For example, see U.S. Pat. No. 7,841,310; U.S. Pat. No. 7,584,728; U.S. Pat. No. 6,941,913; U.S. Pat. No. 6,374,787; U.S. Pat. No. 6,247,434; and U.S. Pat. No. 5,497,738. Due to smaller engines and stricter fuel economy requirements as an impending reality, weight is now considered hyper-sensitive by many automobile manufacturers, requiring the development of new and promising technologies. To meet these requirements, it would be desirable to provide a control valve with a shorter package length and reduced weight.

SUMMARY

The five-way Oil Control Valve (OCV) with an integrated venting spool valve is a hydraulic control device. While the technology is fundamental in nature and applicable across multiple disciplines, it is principally used in automotive applications.

An OCV controls oil between phaser chambers, allowing for cam shaft control and manipulation. This particular five-way OCV accomplishes by means of one valve, what would otherwise be required of multiple valves, due to the unique porting structure of venting through the spool valve. This structure allows for practical and feasible manufacturability and assembly, while making it possible for integration into current automotive sub-systems. Without the unique porting structure of venting through the spool valve, the valve would be exceptionally long by comparison.

The venting spool valve concept has distinct advantages over others in that the disclosed structure results in a shorter package and reduced weight. Due to the impending reality of smaller engines and stricter fuel economy requirements, weight is now considered hyper-sensitive by many automobile manufacturers, requiring the development of new and promising technologies.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
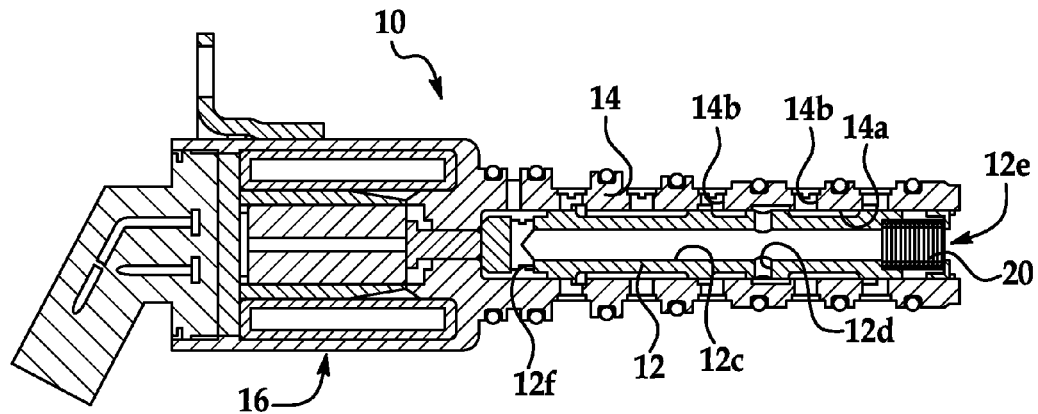
FIG. 1 is a cross sectional view of a solenoid operated oil control valve (OCV) illustrating porting locations in the housing and the bearing.

A variable camshaft timing (VCT) phaser of an internal combustion engine includes a plurality of expandable fluid chambers defining a fluid coupling between a driving stator and driven rotor for adjusting an angular orientation of a driven camshaft relative to a driving crankshaft of the internal combustion engine. An oil control valve (OCV) 10 controls the pressurized fluid flow, such as hydraulic oil, into and out of the expandable fluid chambers in response to a longitudinal position of the valve spool 12 with respect to the valve body 14. The valve spool 12 is driven by an actuator, such as a solenoid operated actuator 16, in response to signals from an engine control unit (ECU).

Referring now to FIGS. 1-4, the fluid control valve 10 includes an elongated valve body 14 having a longitudinally extending aperture 14a and a plurality of radially extending ports 14b formed therein. The valve body 14 including at least one undercut portion 14c located between two adjacent radially extending ports 14b. A valve spool 12 is located for reciprocal movement within the longitudinally extending aperture 14a of the valve body 14 between first and second end limits of travel. The valve spool 12 can include a plurality of lands 12a and reduced diameter portions 12b defining fluid passages 18 for fluid communication with selective radially extending ports 14b depending on a longitudinal position of the valve spool 12 within the valve body 14. The valve spool 12 has a longitudinally extending passage 12c and a radially extending passage 12d. The radially extending passage 12d terminates at a land 12a of the valve spool for fluid communication with the undercut portion 14c of the valve body 14.

The undercut portion 14c of the valve body 14 allows venting of fluid through the longitudinally extending passage 12c of the valve spool 12 when the valve spool 12 is positioned longitudinally in fluid communication with respect to one of the adjacent radially extending ports 14b of the valve body 14. The land 12a of the valve spool 12 has a longitudinal length of sufficient size to allow the at least one radially extending passage 12d terminating in the land 12a to be in fluid communication with either one of the adjacent two radially extending ports 14b of the valve body 14 depending on the longitudinal position of the valve spool 12 within the valve body 14. The longitudinally extending passage 12c of the valve spool 12 can include an open longitudinal end 12e and a radially extending passage 12f terminating at a reduced diameter portion 12b of the valve spool 12.

A spring 20 biases the valve spool 12 toward one of the first and second end limits of travel with respect to the valve body 14. A solenoid actuator 16 drives the valve spool 12 in longitudinal movement within the valve body 14 against the urgings of the spring 20.

Figure 2:
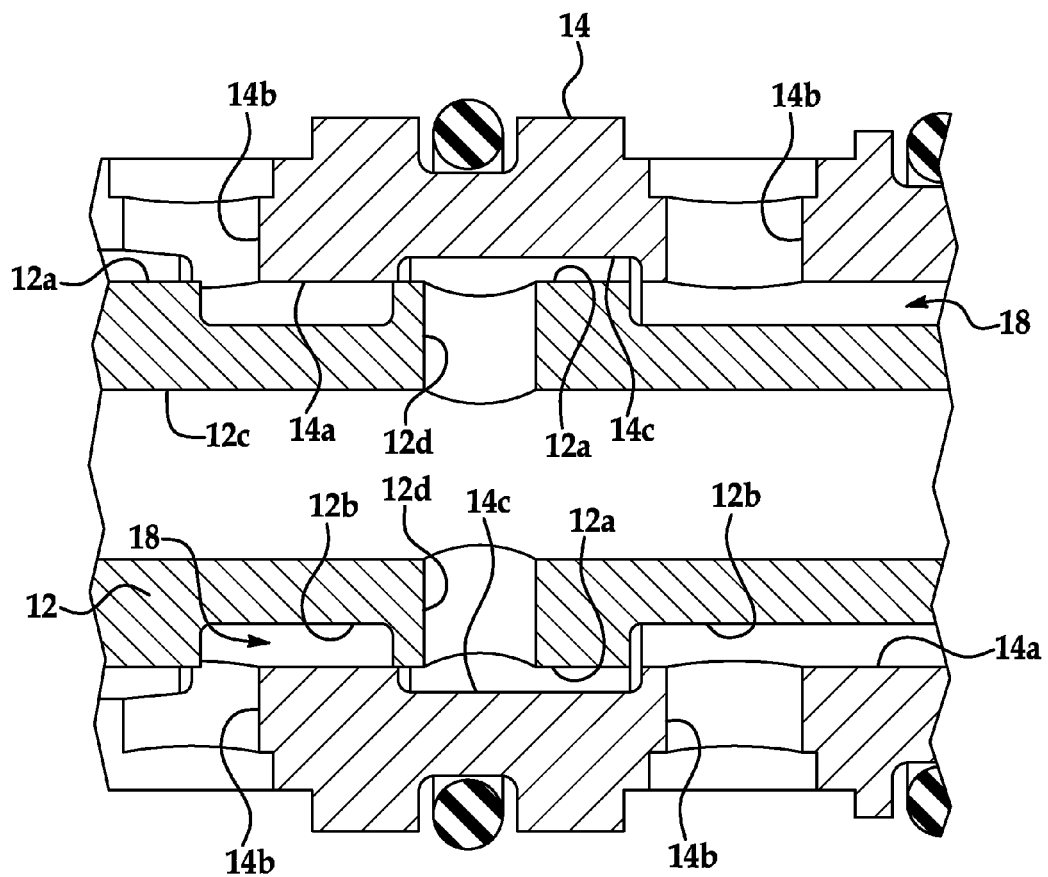
FIG. 2 is a detail cross sectional view of an undercut venting structure of FIG. 1.
Figure 3:
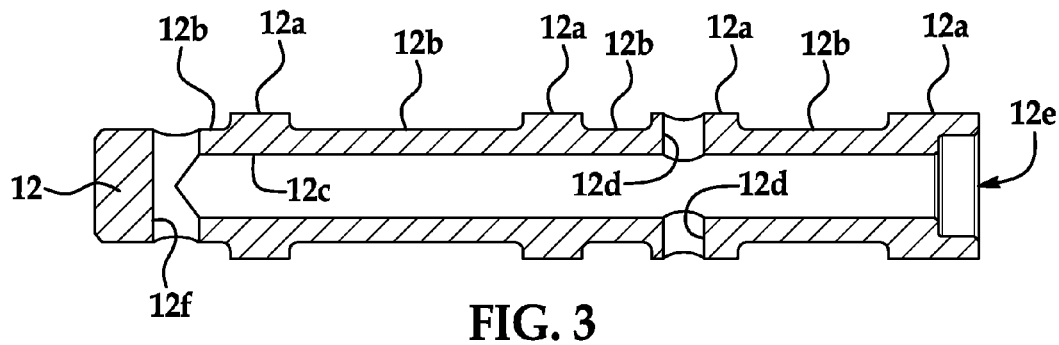
FIG. 3 is a detail cross sectional view of an undercut vented spool valve of FIG. 1.
Figure 4:
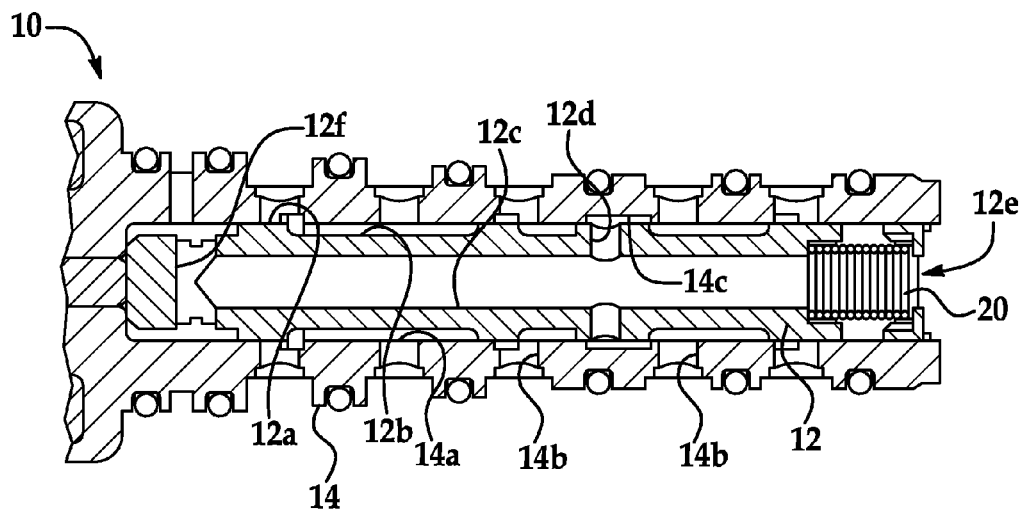
FIG. 4 is a detail cross sectional view of a hydraulic portion of the oil control valve of FIG. 1.

In operation, the valve body 14 and valve spool 12 define a five-way control valve 10 with integrated venting spool 12. The valve spool 12 can be placed in three positions relative to the undercut portion 14c of the valve body as best seen in FIG. 2. First, the valve spool 12 can be positioned so that the radially extending passage 12d is in fluid communication with the undercut portion 14c of the valve body 14 and is sealed from fluid communication with either of the adjacent radially extending ports 14b of the valve body. This can be referred to as a neutral or non-venting null position. Second, the valve spool 12 can be shifted from the null position to the right as depicted in FIG. 2 in order to bring the radially extending passage 12d in fluid communication with the radially extending port 14b positioned to the right of the undercut portion 14c of the valve body 14. This allows the expandable fluid chamber of the phaser communicating with the "right-side" radially extending port 14b to be vented through the longitudinally extending passage 12c of the valve spool 12. Third, the valve spool 12 can be shifted from the null position to the left from the position depicted in FIG. 2 in order to bring the radially extending passage 12d in fluid communication with the radially extending port 14b positioned to the left of the undercut portion 14c of the valve body 14. This allows the expandable fluid chamber of the phaser communicating with the "left-side" radially extending port 14b to be vented through the longitudinally extending passage 12c of the valve spool 12.

Figure 5:
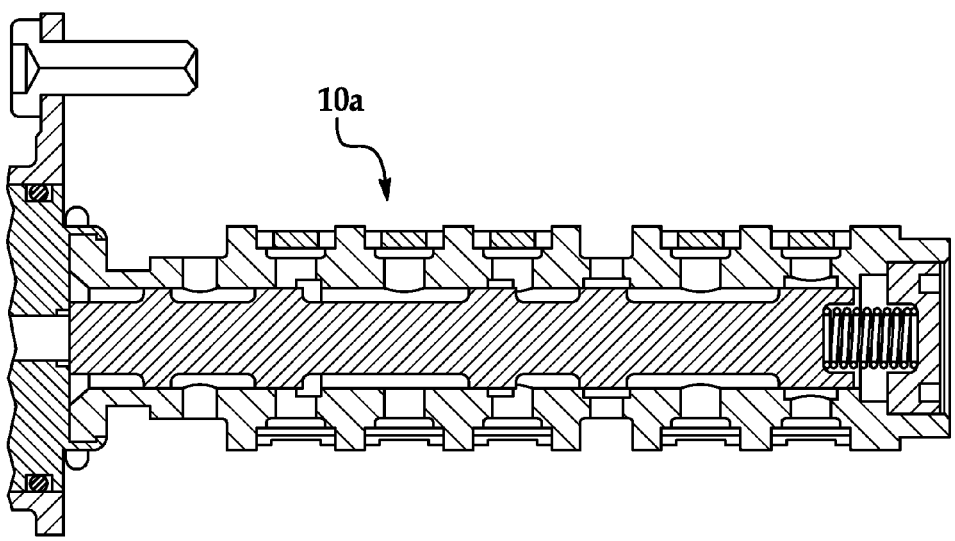
FIG. 5 is a cross sectional view of a prior art actuator illustrating a longer required hydraulic length of the oil control valve for proper function when compared with the improved configuration of the actuator of FIGS. 1-4.

Referring now to FIG. 5, a prior art actuator 10a is illustrated to depict a longer required hydraulic length of 70.55 millimeter (mm) for the oil control valve for proper function when compared with the improved configuration of the actuator of FIGS. 1-4 having a length of 63.24 millimeter (mm). It should be recognized that these dimensions are given by way of example and not limitation with respect to the disclosed configuration for the oil control valve.

It should be recognized that the invention has been disclosed with respect to a control valve for a variable camshaft timing phaser. However the control valve configuration disclosed may be applied to other applications and other fluid control systems without being limited to the variable camshaft timing phaser configuration disclosed. The control valve configuration provides a reduced longitudinal dimension for the required function from that previously available by incorporating the venting passages integrally within the valve spool of the control valve. The control valve configuration disclosed provides reduced weight for the required function from that previously available by incorporating the venting passages integrally within the valve spool of the control valve.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A valve (10) for controlling pressurized fluid flow between expandable fluid chambers of a phaser for adjusting an angular orientation of a driven camshaft relative to a driving crankshaft of an internal combustion engine comprising:

an elongated valve body (14) having a longitudinally extending valve bore (14a) and a plurality of radially extending ports (14b) formed therein, the valve body (14) including at least one undercut portion (14c) located between two adjacent radially extending ports (14b); and a valve spool (12) located within the longitudinally extending valve bore (14a) of the valve body (14) for movement between first and second end limits of travel, the valve spool (12) having a plurality of lands (12a) and reduced diameter portions (12b) defining fluid passages (18) for fluid communication with selective radially extending ports (14b) of the valve body (14) depending on a longitudinal position of the valve spool (12) within the valve body (14), the valve spool (12) having a longitudinally extending passage (12c) and a first radially extending passage (12d), the first radially extending passage (12d) terminating entirely at a land (12a) of the valve spool (12) for fluid communication with the at least one undercut portion (14c) of the valve body (14), wherein the longitudinally extending passage (12c) of the valve spool (12) includes an open longitudinal end (12e) at a first end and a blind end at a second end opposite from the first end, a second radially extending passage (12f) located between the blind end and the first radially extending passage (12d), the second radially extending passage (12f) terminating entirely at a reduced diameter portion (12b) of the valve spool (12).

2. The valve (10) of claim 1, wherein the at least one undercut portion (14c) of the valve body (14) allows venting through the longitudinally extending passage (12c) of the valve spool (12) when the first radially extending passage (12d) of the valve spool (12) is positioned longitudinally in fluid communication with respect to one of the adjacent radially extending ports (14b) of the valve body (14).

3. The valve (10) of claim 1, wherein the land (12a) of the valve spool (12) has a longitudinal length allowing the first radially extending passage (12d) terminating therein to be in fluid communication with either one of the two adjacent radially extending ports (14b) of the valve body (14) depending on the longitudinal position of the valve spool (12) within the valve body (14), and sealing the first radially extending passage (12d) from fluid communication with either one of the two adjacent radially extending ports (14b) of the valve body (14) when in a null position.

4. The valve (10) of claim 1 further comprising:
   a spring (20) for biasing the valve spool (12) toward one of the first and second end limits of travel with respect to the valve body (14).

5. The valve (10) of claim 4 further comprising:
   a solenoid actuator (16) for driving the valve spool (12) in longitudinal movement against the spring (20) within the valve body (14).

\* \* \* \* \*